(12) United States Patent
Santagiuliana

(10) Patent No.: US 12,030,070 B2
(45) Date of Patent: Jul. 9, 2024

(54) ELASTIC ELEMENT FOR A DEVICE FOR DISPENSING FLUIDS OR MIXTURES AND METHOD AND MOULD FOR MAKING SAID ELASTIC ELEMENT

(71) Applicant: TAPLAST S.R.L., Povolaro (IT)

(72) Inventor: Evans Santagiuliana, Vicenza (IT)

(73) Assignee: TAPLAST S.R.L. (IT)

( * ) Notice: Subject to any disclaimer, the term of this patent is extended or adjusted under 35 U.S.C. 154(b) by 75 days.

(21) Appl. No.: 17/516,052

(22) Filed: Nov. 1, 2021

(65) Prior Publication Data

US 2022/0055053 A1 Feb. 24, 2022

Related U.S. Application Data

(63) Continuation of application No. 15/528,324, filed as application No. PCT/IB2015/058915 on Nov. 18, 2015, now abandoned.

(30) Foreign Application Priority Data

Nov. 20, 2014 (IT) .............. VI2014A000301

(51) Int. Cl.
*B05B 11/10* (2023.01)
*B29C 33/44* (2006.01)
(Continued)

(52) U.S. Cl.
CPC ...... *B05B 11/1077* (2023.01); *B05B 11/1001* (2023.01); *B05B 11/1023* (2023.01);
(Continued)

(58) Field of Classification Search
CPC ........ B60G 2204/128; B60G 2202/314; B05B 11/1001; B29C 45/2602; B29C 45/262; B29L 2031/703
(Continued)

(56) References Cited

U.S. PATENT DOCUMENTS 5,673,824 A * 10/1997 Evans ................ B05B 11/1077
222/321.9
5,853,178 A * 12/1998 Wydra ................... B29C 49/00
277/944
(Continued)

FOREIGN PATENT DOCUMENTS

CN 201880641 U * 6/2011
FR 2877259 A1 * 5/2006 ........... B29C 33/446
(Continued)

OTHER PUBLICATIONS

Machine translation JPH1073162A (Year: 1998).*
Machine translation FR2877259A1 (Year: 2006).*
Machine translation JPH02296023A (Year: 1990).*
Machine translation CN201880641U (Year: 2011).*

*Primary Examiner* — Jacob T Minskey
*Assistant Examiner* — Wayne K. Swier
(74) *Attorney, Agent, or Firm* — McDonald Hopkins LLC

(57) ABSTRACT

The invention concerns an elastic element (100) made of a plastic material for a device (1) for dispensing fluids (L), comprising a tubular body (129) that develops around a main longitudinal axis (X), comprising a main portion that develops according to a spiral-shaped pattern and extends longitudinally between a first end portion (100*a*) and a second end portion (100*b*) opposite the first end portion (100*a*). One of the first and second end portions comprises a first projection (151) extending from the internal surface of the tubular body (129) towards the inner space defined by the tubular body (129). The invention furthermore concerns a method for making an elastic element (100) through an injection moulding process, a mould (200) for making an elastic element (100).

3 Claims, 11 Drawing Sheets

(51) Int. Cl.
   *B29C 45/26* (2006.01)
   *B29C 45/40* (2006.01)
   *B29C 45/44* (2006.01)
   *B29K 23/00* (2006.01)
   *B29L 23/00* (2006.01)

(52) U.S. Cl.
   CPC ...... B05B 11/1074 (2023.01); B29C 45/2602 (2013.01); B29C 45/262 (2013.01); B29C 45/2681 (2013.01); B29C 45/44 (2013.01); *B05B 11/1067* (2023.01); *B29C 33/446* (2013.01); *B29C 2045/4078* (2013.01); *B29K 2023/06* (2013.01); *B29K 2023/12* (2013.01); *B29K 2995/0046* (2013.01); *B29L 2023/00* (2013.01)

(58) Field of Classification Search
   USPC .......................................................... 267/220
   See application file for complete search history.

(56) References Cited

U.S. PATENT DOCUMENTS

| | | | |
|---|---|---|---|
| 6,426,030 B1 * | 7/2002 | Julian | B29C 43/42 264/318 |
| 2003/0047883 A1 * | 3/2003 | Imazu | F16J 3/042 277/634 |
| 2006/0116213 A1 * | 6/2006 | Ohshita | F16D 3/845 464/175 |
| 2012/0153540 A1 * | 6/2012 | Kurimoto | B29C 45/33 425/556 |

FOREIGN PATENT DOCUMENTS

| | | | | |
|---|---|---|---|---|
| JP | H02296023 A1 | * | 12/1990 | |
| JP | 10073162 A | * | 3/1998 | ......... B29C 45/2618 |
| WO | WO-9420221 A1 | * | 9/1994 | ......... B05B 11/0005 |

* cited by examiner

ELASTIC ELEMENT FOR A DEVICE FOR DISPENSING FLUIDS OR MIXTURES AND METHOD AND MOULD FOR MAKING SAID ELASTIC ELEMENT

This application claims priority to U.S. Ser. No. 15/528,324 filed on Nov. 18, 2017 and co-pending as of the date of this latest application filing. Both applications also claim priority to Italian application VI2014000301, filed on Nov. 20, 2014.

TECHNICAL FIELD OF THE INVENTION

The invention concerns an elastic element for a device for dispensing fluids, said device being suited to be applied to a container that holds the fluid itself, the device being in particular suited to dispense food substances, perfumes or detergents in general, even atomized or in the form of foam. The invention concerns also a method and a mould for making an elastic element of the type described above.

DESCRIPTION OF THE STATE OF THE ART

As is known, dispensing devices that are applied to the container holding the product to be dispensed are widely used to dispense liquid or creamy products such as food substances, soaps, creams, detergents or perfumes.

Said devices are substantially constituted by a cap provided with means suited to be coupled to the neck of the container and with a hollow body that defines a fluid suction/compression chamber, also called accumulation chamber, which is slidingly coupled to a piston.

The piston comprises a plunger and a rod, the latter being provided with an actuator element also called spout or nipple and suited to be operated by the user.

In order to dispense a predetermined quantity of the fluid contained in the device, the user presses the actuator element, and thus the piston, shifting it from an initial rest position to a second and final operating position.

During said pressing step, the predetermined quantity of fluid flows out of a suitable duct associated with the spout.

Once the fluid has been dispensed, the operator releases the actuator element that, together with the piston, automatically returns to the initial rest position.

In order to allow said automatic return movement, the device advantageously comprises an elastic element associated with the piston and with the actuator element, which is compressed and loaded while the user exerts a pushing action, thus pressing it, while it releases the piston when the user leaves hold of the actuator.

Preferably, in the initial rest position of the actuator and the piston, the elastic element is maintained in a pre-load condition. This means that the elastic element is assembled in a slightly compressed condition, in order to generate a pre-load force on the piston and thus maintain it in its rest position in a stable manner.

Therefore the user, acting on the actuator, exerts a pressing force that makes it possible to dispense the fluid present in the suction/compression chamber and also to load (compress) the elastic element associated with the piston.

The resistance to compression exerted by the elastic elements normally used in the known technique increases as compression increases, so that also the force required by the user increases as compression increases.

For example, in the case of metallic helical springs the compression force develops linearly and increasingly with respect to the degree of compression exerted.

This is an inconvenience for the user, who needs to press the actuator with an increasingly higher pushing force in order to be able to dispense the product effectively.

Furthermore, the force exerted during the release step in order to move the piston back to the rest position is smaller than the force exerted by the user during compression, the degree of compression being the same.

The result of this effect, also known as hysteresis of the elastic element, is that a given quantity of energy is lost between the steps of compression and release of the elastic element, with the risk that the piston and the actuator element associated with it are not brought back to the correct initial rest position.

In the attempt to at least partly overcome the drawbacks described above, elastic elements made of a plastic material were proposed in the past, which were obtained through a blowing or injection moulding process; the high elastic memory coefficient of the plastic materials makes it possible, in fact, to give the elastic elements the desired characteristics of elasticity.

Furthermore, another factor that allows the desired elasticity characteristics to be obtained is represented by the shape of the elastic elements, wherein the most performing shapes can be obtained through blowing and/or injection moulding techniques.

However, in the case of elastic elements made of a plastic material, it is their production that entails some problems, as, for example, the choice of the most performing plastic materials in terms of elastic response is limited due to the problems generated by the same materials during the blowing and/or injection moulding process.

In fact, the most performing elastic materials pose the problem that the removal of the elastic element from the mould is difficult, as the most performing elastic materials tend to adhere and therefore to remain attached to the mould itself.

It is thus the object of the present invention to at least partly overcome the drawbacks summed up above.

In particular, it is an object of the present invention to provide a solution for the production of elastic elements in a plastic material that allows plastic elastic elements with satisfying elastic characteristics (equal or at least approximating the ideal elastic characteristics) to be obtained, wherein the process for making said elastic elements is not complicated by the plastic characteristics of the materials but on the contrary allows the widest range of plastic materials to be selected.

In further detail, it is another object of the present invention to propose a solution for making plastic elastic elements of the type mentioned above that makes it possible to easily remove the elements from the respective moulds.

SUMMARY OF THE PRESENT INVENTION

The present invention is based on the general consideration according to which the drawbacks of the solutions of the known art can be overcome or at least minimized by selecting and producing plastic elastic elements in a suitable shape. In particular, according to a further consideration on which the present invention is based, by conveniently selecting the shape (and possibly the size) of the elastic element it is possible to give the elastic element the desired elastic characteristics and also to facilitate the removal of the element from the respective mould, and this almost without any limitation to the choice of plastic materials.

According to a first embodiment, the subject of the present invention is an elastic element made of a plastic material for a device for dispensing fluids according to claim 1, meaning an elastic element in a plastic material comprising a tubular body that develops around a main longitudinal axis, said tubular body comprising at least one main portion developing according to a spiral-shaped pattern and extending along the longitudinal direction between a first end portion and a second end portion opposite said first end portion, wherein at least one of said first and second end portions comprises at least one first projection extending from the internal surface of said tubular body towards the inner space defined by said tubular body.

According to a construction variant, said at least one end portion comprises a tubular portion with a substantially cylindrical inner wall that extends in the longitudinal direction from said main portion developing according to a spiral-shaped pattern, wherein said at least one first projection extends from said substantially cylindrical inner wall.

If necessary, said at least one first projection extends along a direction that is substantially perpendicular to said main longitudinal axis (X) and said at least one end portion may comprise a plurality of first projections arranged so that they are spaced from each other at substantially regular intervals along said internal surface of said tubular body.

According to a further construction variant, said second end portion of said tubular body opposite said first end portion comprises at least one second projection that extends along a direction substantially parallel to said main longitudinal axis.

Preferably, said at least one second projection extends from an end wall that is substantially perpendicular to said main longitudinal axis towards the outside of said main body and/or said end wall is in the shape of an annulus.

The subject of the present invention includes also a method for making an elastic element in a plastic material through an injection moulding process, said method comprising the following steps:
    providing an injection moulding press comprising a hollow die and a male punch rotatably arranged inside said die in such a way as to define an interspace between said die and said punch, in a shape corresponding to that of said elastic element;
    injecting plastic material in the pasty state into said interspace;
    removing said punch by rotating it around its longitudinal axis,
    wherein during the rotation of said punch at least one of said first and second projections of said elastic element becomes engaged in a corresponding seat provided in said mould, so that said elastic element cannot be set rotating by said punch.

If necessary, said mould may comprise a bush suited to house said punch, in which said punch is rotatably accommodated, and wherein during the rotation of said punch at least one of said first projections becomes engaged in a corresponding seat provided in said housing bush.

Furthermore, said mould may comprise an injection unit suited to be positioned at the level of said interspace in such a way as to allow said plastic material in the pasty state to be injected into said interspace, wherein during the rotation of said punch at least one of said second projections becomes engaged in a corresponding seat provided in said injection unit.

According to the present invention, furthermore, a mould is provided that is suitable for making an elastic element in a plastic material, said mould comprising at least one rotatable male punch defining a longitudinal rotation axis and at least one hollow die, said at least one male punch and said at least one hollow die being suited to be mutually positioned in such a way as to define said interspace in a shape corresponding to that of said elastic element, wherein said mould comprises at least one cavity suited to receive the portion of said plastic material in the pasty state intended to be used to make at least one of said first and second projections, said at least one cavity thus defining at least one seat in which at least one of said first and second projections can become engaged during the rotation of said punch around said longitudinal rotation axis.

If necessary, said mould may comprise at least one housing bush in which said male punch is rotatably accommodated, wherein said at least one cavity is defined by said housing bush, said at least one cavity thus defining a seat in which at least one of said first projections can become engaged during the rotation of said punch around said longitudinal rotation axis.

If necessary, said mould may comprise an injection unit suited to be positioned at the level of said interspace in such a way as to allow said plastic material in the pasty state to be injected into said interspace, wherein said injection unit comprises at least one second cavity suited to accommodate the portion of said plastic material in the pasty state intended to be used to make at least one of said second projections, said at least one second cavity thus defining a seat in which at least one of said second projections can become engaged during the rotation of said punch around said longitudinal rotation axis.

Possible further embodiments of the present invention are defined in the claims.

BRIEF DESCRIPTION OF THE DRAWINGS

Further advantages, objectives and characteristics of the present invention, as well as further embodiments of the same, are defined in the claims and highlighted here below through the following description, with reference to the attached drawings; in the drawings, corresponding or equivalent characteristics and/or component parts of the present invention are identified by the same reference numbers. In particular, in the drawings:

FIG. 3A shows an enlarged detail of FIG. 3;

DETAILED DESCRIPTION OF THE PRESENT INVENTION

The examples of embodiment of the invention described below refer to an elastic element for a device for dispensing fluids and in particular for dispensing detergent fluids, wherein, however, the proposed solution can be applied also to devices for dispensing perfumes or food products or any other fluid in general that must be drawn from a container and conveyed towards the outside even atomized or in the form of foam.

Figure 1:
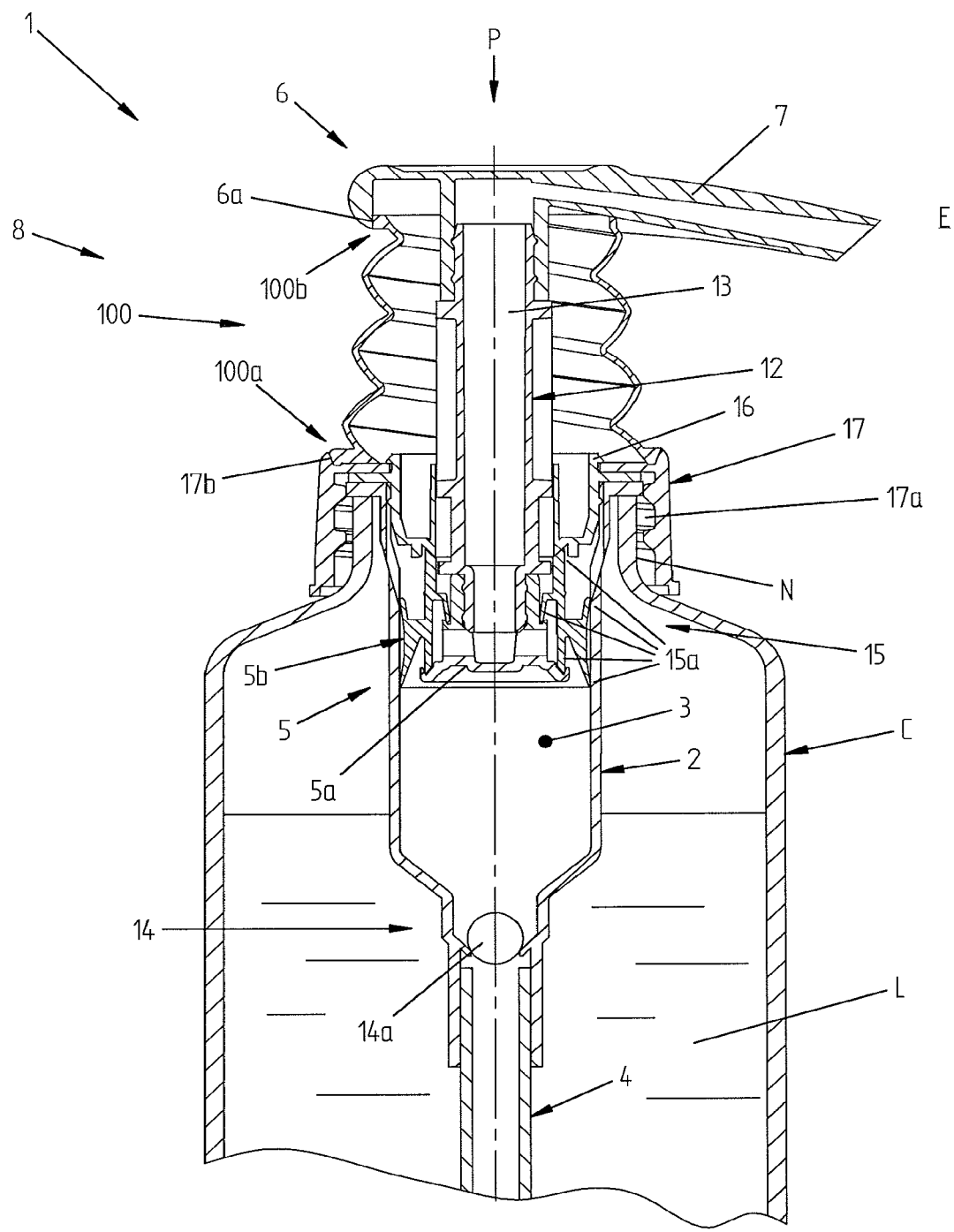
FIG. 1 shows a longitudinal sectional view of an example of a device for dispensing fluids or mixtures comprising the elastic element that is the subject of the invention.

An example of a device 1 for dispensing fluids applied to the neck N of a container C containing a fluid L to be dispensed is shown in FIG. 1.

It comprises a hollow body 2 that defines a suction/compression chamber 3 for the fluid L, provided with a suction duct 4 for the fluid L, which is slidingly coupled with a movable piston 5 (from top to bottom and vice versa with reference to the figure) that moves between a first rest position, visible in FIG. 1, and at least one second operating position, not represented in the figures.

The device 1 can be operated by the user through an actuator element 6 comprising an operating button also called spout or nipple 7, which is integral with the piston 5.

The hollow body 2 is integral with a ring nut 16 that supports and guides the piston 5. The support ring nut 16 is in turn associated with a bearing element 17 suited to be applied to the neck N of the container C. In the embodiment shown herein an inner thread 17a allows said application.

Once the dispensing operation has been completed, an elastic element 100 made of a plastic material ensures the return of the piston 5 from the operating position to the rest position.

The elastic element 100 is interposed between the bearing element 17 and the actuator element 6 and thus with its first end 100a counteracts the bearing element 17 and with its second end 100b, opposite the first end 100a, counteracts the actuator element 6.

The first end 100a of the elastic element 100 is housed in a suitable seat 17b created in the bearing element and, analogously, the second end 100b of the elastic element 100 is housed in a suitable seat 6a created in the actuator element.

As regards the piston 5, this comprises a supporting element 5a slidingly coupled with a plunger 5b that sealingly cooperates with the walls of the suction/compression chamber 3.

The supporting element 5a is coupled through interference with a rod 12 that is integral with the actuator element 6.

The supporting element 5a and the rod 12 are provided with a dispensing duct 13 suited to dispense the fluid L and communicating with the suction/compression chamber 3 and with the external environment E.

First valve means 14 arranged downstream of the suction duct 4 and second valve means 15 arranged upstream of the dispensing duct 13 regulate the flow of the fluid L from the container C to the suction/compression chamber 3 and its flow from the chamber 3 to the dispensing duct 13.

In the example of embodiment illustrated herein, the first valve means 14 comprise a ball 14a made of a non-metallic material, while the second valve means 15 are constituted by sealing edges 15a belonging to the plunger 5b and suited to cooperate with the supporting element 5a and with the walls of the suction/compression chamber 3 and to become engaged in corresponding grooves obtained in the support and guide ring nut 16.

The operation of the dispensing device 1 is described here below with reference to FIG. 1.

From the operating point of view, the user acts on the actuator element 6 by exerting a certain amount of pressure P that moves the piston 5 axially (downwards in the figure).

In this way, the user loads the elastic element 100 and compresses the product contained in the suction/compression chamber 3.

The increased pressure makes the plunger 5b slide on the supporting element 5a, thus allowing the fluid L contained in the suction/compression chamber 3 to flow out, first towards the dispensing duct 13 and then towards the outside E.

Once the plunger 5b has reached the bottom of the suction/compression chamber 3, it is released by the user, thus allowing the elastic element 100 to bring it back to the initial rest position shown in FIG. 1.

The elastic return of the piston 5 generates a negative pressure inside the suction/compression chamber 3 and this causes the first valve means 14 located downstream of the suction duct 4 to intervene and the fluid L to flow into the chamber itself, drawing it from the container C and preparing the device 1 for the successive dispensing operation.

Figure 2:
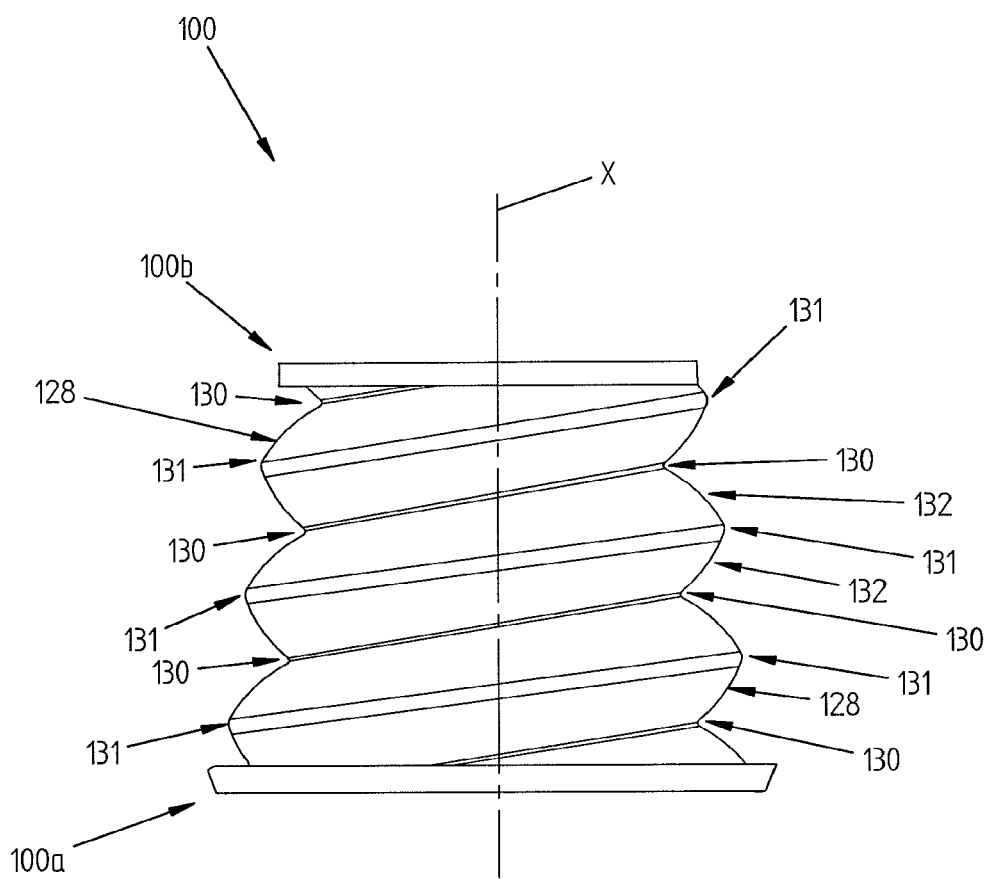
FIG. 2 shows a side view of the elastic element according to an embodiment of the present invention.

The elastic element 100 carried out according to an embodiment of the invention is described here below with reference to FIGS. 2 and 3.

The elastic element 100 comprises a side wall 128 that extends over a predetermined length H between the first end or bottom end 100a of the elastic element 100 and its second end or top end 100b.

The length H thus defines the size of the elastic element 100.

Figure 3:
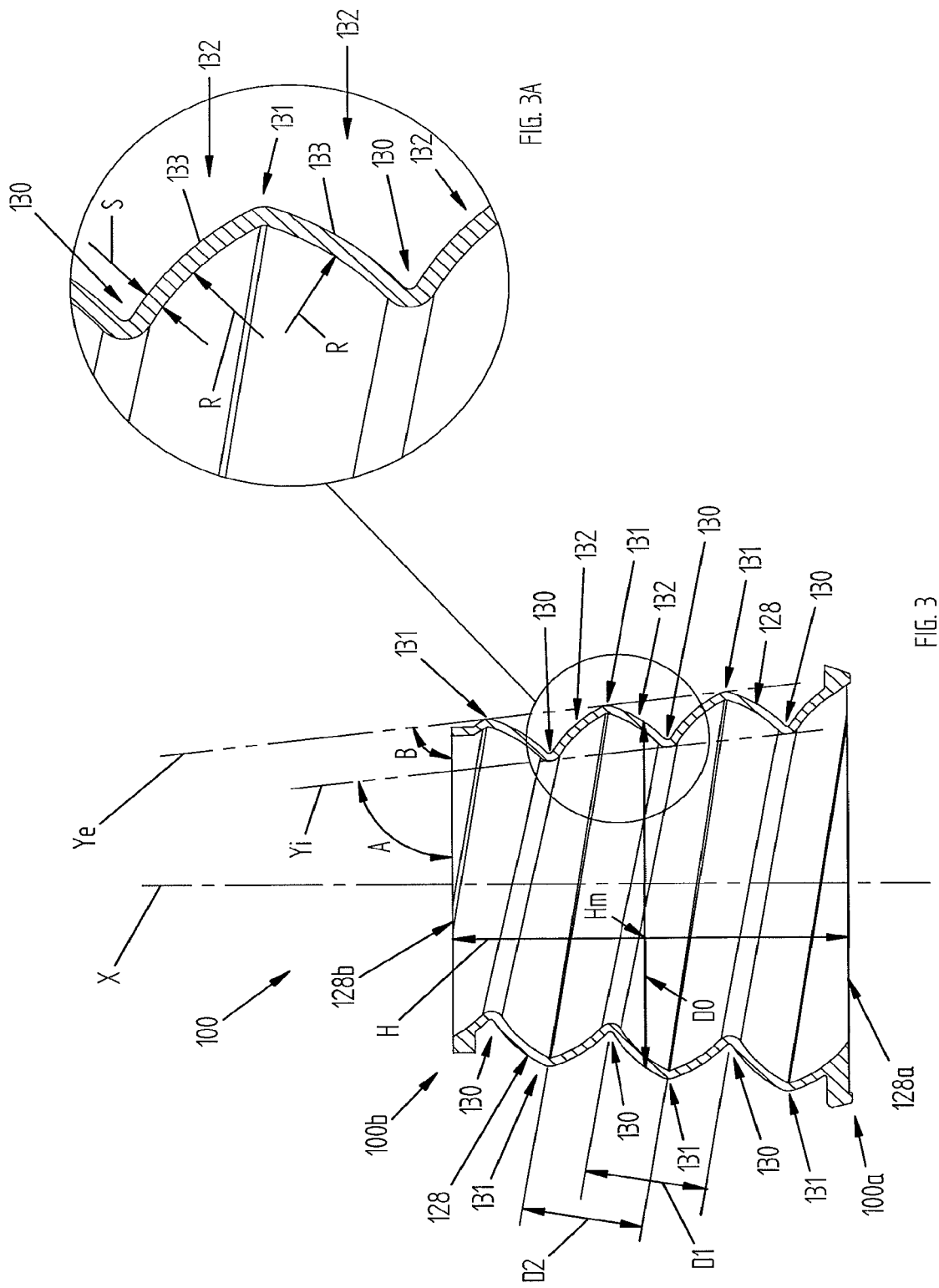
FIG. 3 shows a longitudinal sectional view of the element of FIG. 2.

The side wall 128 develops around a main longitudinal axis X so as to enclose it completely, except for the upper and lower openings 128a and 128b at the level of the respective bottom end 100a and top end 100b, as shown in FIG. 3.

On the elastic element 100 it is possible to determine the parameter D0, as shown in FIG. 3, identified as the distance defined by the external surface of the side wall 128 of the elastic element 100 on an axis that is perpendicular to the main axis X and passes through the mid-point Hm of the height H. The parameter D0 represents, therefore, the outer diameter in the median area of the elastic element 100.

The side wall 128 of the elastic element 100 thus defines a substantially tubular body 129 with a main portion included between the two opposite ends 100a and 100b and developing according to a spiral-shaped pattern.

As can be observed in the longitudinal sectional view of FIG. 3, said spiral-shaped pattern defines for the side or external wall 128 an alternation between external apices 131 and internal apices 130.

Each external apex 131 is connected to a corresponding adjacent internal apex 130 by a connecting portion 132.

The connecting portions 132 substantially develop according to the same pattern and preferably comprise a curved section 133, as shown in FIG. 3A.

Preferably, the curved section 133 comprises an arc of a circle with radius R.

The curvature radius R of the arc of a circle 133 is selected based on the value of the parameter D0 and is preferably included between 0.15*D0 and 0.60*D0, more preferably included between 0.25*D0 and 0.45*D0, and even more preferably equal to 0.35*D0.

Advantageously, the selection of said curvature radiuses for the arc of a circle of the curved section 133 makes it possible to reduce to a minimum the stroke necessary to place the elastic element 100 in the pre-load condition, that is, the condition in which it is slightly compressed in order to generate a preload force on the piston 5 so as to maintain it in its rest position in a stable manner.

In the embodiment of the invention described herein, the curved sections 133 along the elastic element 100 between the first end 100a and the second end 100b have a substantially constant curvature radius R.

In variant embodiments of the invention, however, the curved sections 133 along the elastic element 100 between the first end 100a and the second end 100b can have different curvature radiuses.

The internal apices 130 are substantially arranged on a hypothetical internal surface of internal envelope Yi that forms an angle A with the main longitudinal axis X, as shown in FIG. 3.

Preferably, the angle A between the internal envelope surface Yi and a plane perpendicular to the main longitudinal axis X is included between 78° and 88°, more preferably included between 81° and 85° and even more preferably equal to 83°.

Analogously, the external apices 131 are substantially arranged on an external envelope surface Ye that forms an angle B with the main longitudinal axis X, as indicated in FIG. 3.

Preferably, the angle B between the external envelope surface Ye and the main longitudinal axis X is included between 78° and 88°, more preferably included between 81° and 85° and even more preferably equal to 83°.

The shape given to the elastic element 100 is thus substantially the shape of a truncated cone.

Advantageously, the choice of said angle A between the internal envelope surface Yi and the main longitudinal axis X and the choice of the angle B between the external envelope surface Ye and the main longitudinal axis X makes it possible to reduce the overall dimensions of the elastic element 100 in the compressed condition.

In fact, in the compressed condition of the elastic element 100, the internal apices 130 and the external apices 131 of the external side wall 128 are in offset and not superimposed positions and therefore the turns that make up the external side wall 128 interpenetrate one another.

The external side wall 128 of the elastic element 100 has a substantially constant thickness S.

The thickness S is selected based on the value of the parameter D0 and is preferably included between 0.01*D0 and 0.04*D0, more preferably included between 0.02*D0 and 0.03*D0 and even more preferably equal to 0.025*D0. Advantageously, the choice of the thickness S makes it possible to optimize the ratio between elastic force and minimum hysteresis of the material.

The distance D1 between two adjacent internal apices 130 is selected based on the value of the parameter D0 and is preferably included between 0.01*D0 and 0.5*D0, more preferably included between 0.02*D0 and 0.04*D0 and even more preferably equal to 0.032*D0.

The distance D2 between two adjacent external apices 131 is selected based on the value of the parameter D0 and is preferably included between 0.01*D0 and 0.5*D0, more preferably included between 0.02*D0 and 0.04*D0 and even more preferably equal to 0.032*D0.

Advantageously, the choice of said distance D1 between two adjacent internal apices 130 and of said distance D2 between two adjacent external apices 131 makes it possible to optimize the load of the elastic element 100 with respect to its size when it is compressed.

The elastic element is made of a plastic material, such as polypropylene, polyethylene or TPE (thermoplastic elastomer).

The tensile modulus of said material is preferably included between 50 Mpa and 300 Mpa, more preferably included between 80 Mpa and 220 Mpa.

Advantageously, the choice of the value of the tensile modulus makes it possible to optimize the hysteresis value of the material used, thus reducing the size of the elastic element 100.

The hardness of the material of which the elastic element 100 is made is preferably included between 20 and 70 Shore D, more preferably included between 35 and 60 Shore D and even more preferably equal to 45 Shore D.

Figure 4:
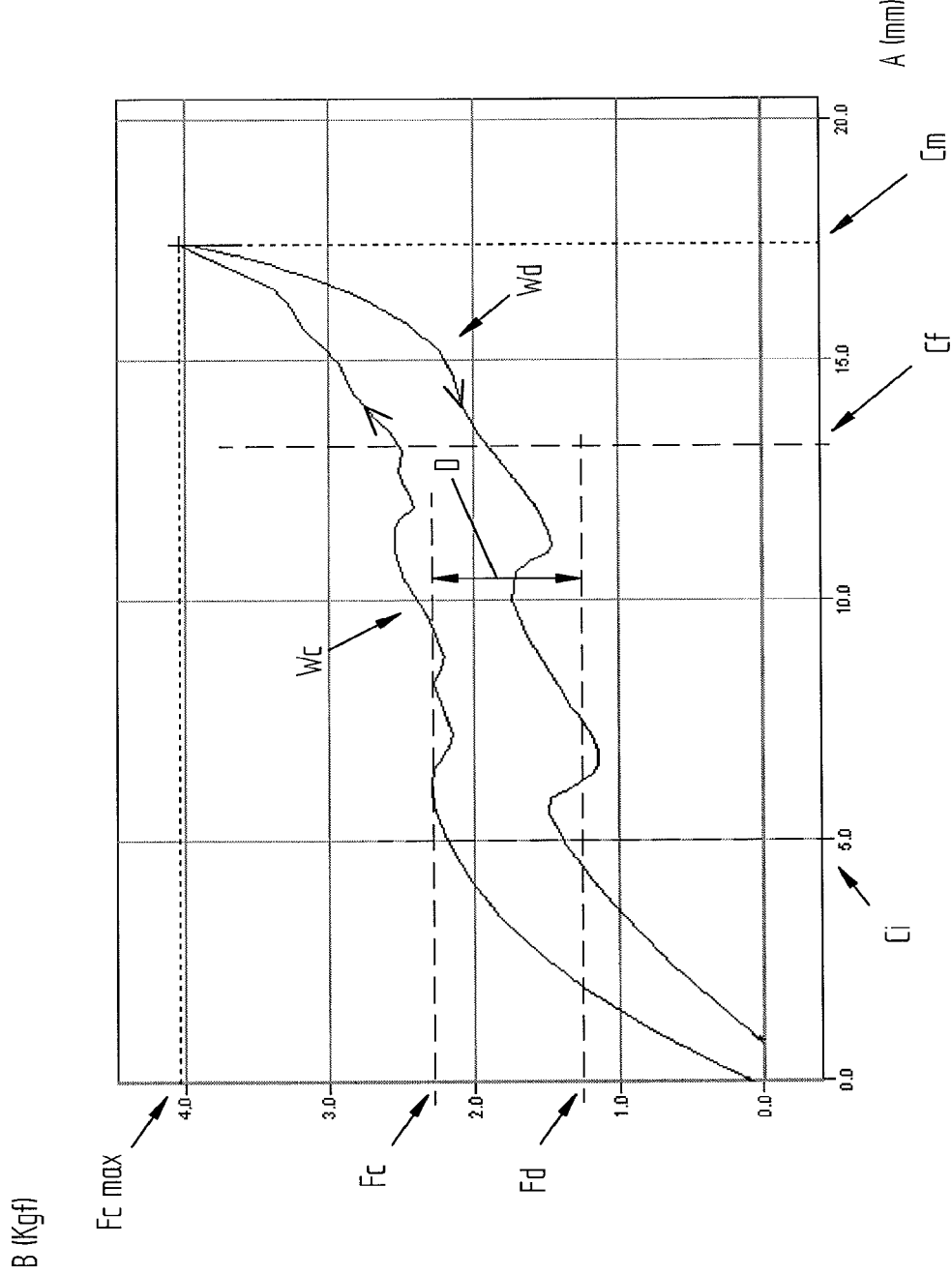
FIG. 4 shows the curve of some characteristic measures of the elastic element of FIG. 2.
Figure 5A:
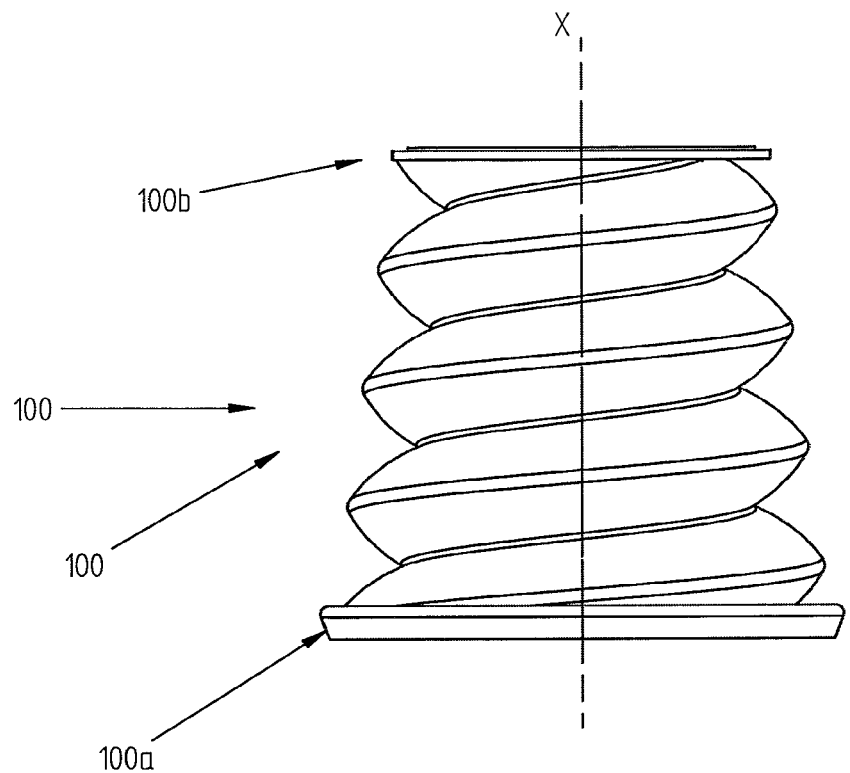
FIGS. 5A and 5B respectively show a side view and a longitudinal sectional view of a further embodiment of the elastic element according to the present invention.
Figure 5B:
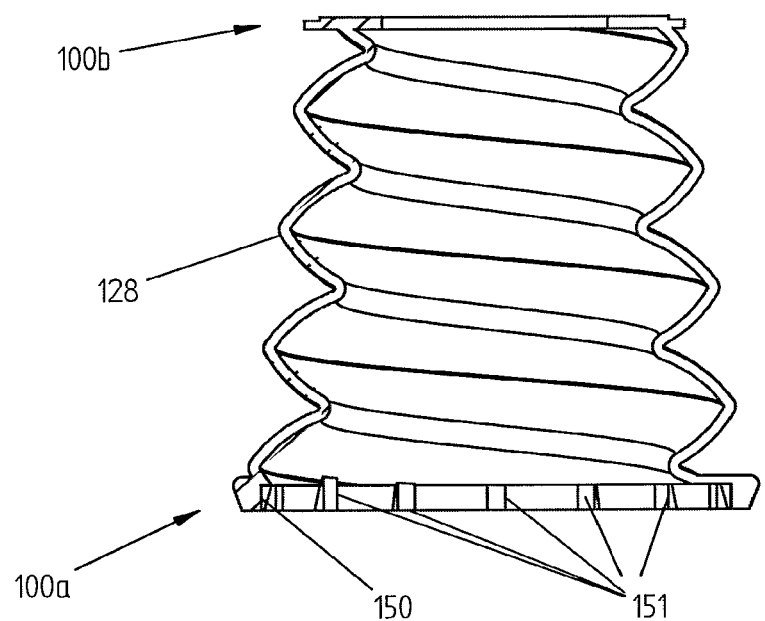
Figures 6A, 6B:
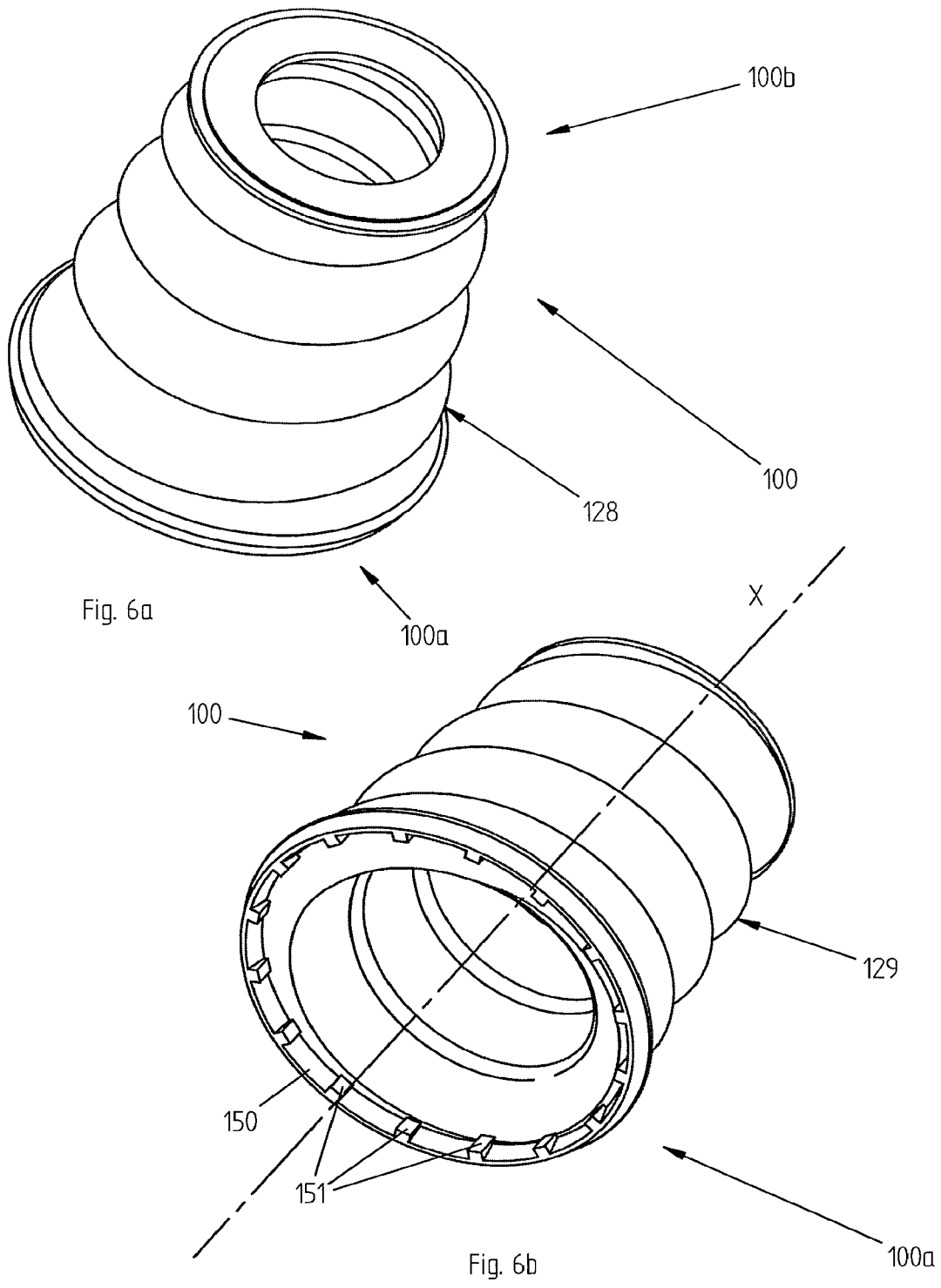
FIGS. 6A and 6B show each a perspective view of an elastic element according to an embodiment of the present invention.

FIG. 4 shows the characteristic curve of an elastic element 100 according to the invention, with length H equal to 29 mm, wherein R=7.4 mm, S=0.5 mm, D1=6.8 mm, D2=6.8 mm, A=6.8°, B=6.8°, and which is made of TPE (thermoplastic elastomer).

This curve shows the development of the loading force of the elastic element 100 (y-axis B) with respect to the degree of compression of the elastic element 100 (x-axis A). The curve represents a complete cycle constituted by a compression phase We and a release phase Wd of the elastic element 100.

In particular, the elastic element 100 is subjected to a maximum compression Cm of approximately 17.5 mm and then released.

The values indicated in the diagram show how during the compression phase We the elastic element 100 has a central area with compression values included between Ci=5 mm and Cf=13 mm with substantially ideal characteristics, meaning that for a considerable portion the loading force applied is substantially constant and has a value FC of approximately 2.3 Kgf.

The elastic element 100 is mounted on the dispensing device 1 in such a way that it operates in an ideal manner and thus between said limit compression values included between Ci and Cf.

In particular, in the rest condition shown in FIG. 1, the elastic element 100 will be in a slightly compressed pre-load condition, with a compression value Ci equal to 5 mm.

Analogously, in the condition of maximum compression, the elastic element 100 will be in a compressed condition with a compression value Cf equal to 13 mm.

It should finally be noted that the hysteresis of the elastic element 100 of the invention is advantageously reduced. In fact, the value of the hysteresis D given by the difference between the loading force Fc during the compression phase We and loading force Fd during the release phase Wd is reduced.

Preferably, the amplitude of the hysteresis D is maintained at values lower than half the maximum compression force Fcmax of the elastic element corresponding to the value of maximum compression Cm, that is, preferably 11:0.5*Fcmax.

More preferably, the amplitude of the hysteresis D is maintained at values lower than one fourth of the maximum compression force Fcmax of the elastic element corresponding to the value of maximum compression Cm, that is, $D \leq 0.25*Fcmax$.

According to a construction variant not represented herein, the elastic element of the invention may comprise two portions substantially in the shape of a truncated cone, adjacent to and opposing each other.

According to a further embodiment of the invention not represented herein, the connecting portion 132 between the external apex 131 and the adjacent internal apex 130 develops according to a substantially mixtilinear pattern, comprising a first curved section 133, preferably an arc of a circle, and a second substantially linear section.

According to a further embodiment of the elastic element of the invention not represented herein, at the level of the external apices 131 and of the internal apices 130 the external side wall is thicker, so as to define a rib for said apices.

Said rib makes the external side wall more resistant at the level of the apices 130 and 131, the latter being subjected to continuous stress during compression and release of the elastic element while it is being operated.

A description of a further embodiment of the elastic element according to the present invention is provided here below with reference to FIGS. 5A, 5B, 6A and 6B.

It is clear from the figures that the elastic element 100 represented therein always comprises a main tubular body 129 substantially in the shape of a truncated cone, similar to that present in the embodiment previously described, constituted by a side wall 128 that develops around a main longitudinal axis X, in such a way as to define an internal space. The main tubular body 129 comprises in particular a main portion that develops according to a spiral-shaped pattern extending in the longitudinal direction (along a direction parallel to the axis X) between a first end portion 100*a* and a second end portion 100*b* opposite said first end portion 100*a*. The main characteristic of this embodiment lies in that, at the level of the first end portion 100*a*, a plurality of projections 151 extend from the internal surface of the side wall 128 (of the main body 129) towards the inside of the main tubular body 129, the function of said projections being to facilitate the process of production of the elastic element 100 (in particular, through injection moulding), as clarified in greater detail below. In particular, the projections 151 extend from the substantially cylindrical internal surface 150 of the first end portion 100*a*. In the specific case represented herein, the cross section of the projections (perpendicular to the direction of extension) is substantially rectangular and they substantially extend along a direction that is perpendicular to the axis X. Furthermore, the projections 151 are arranged at regular intervals from each other along the internal surface 150. Obviously, however, the extension, the cross section, the number, the mutual distance etc. of the projections 151 can be changed and selected according to the needs and/or circumstances.

Figure 7:
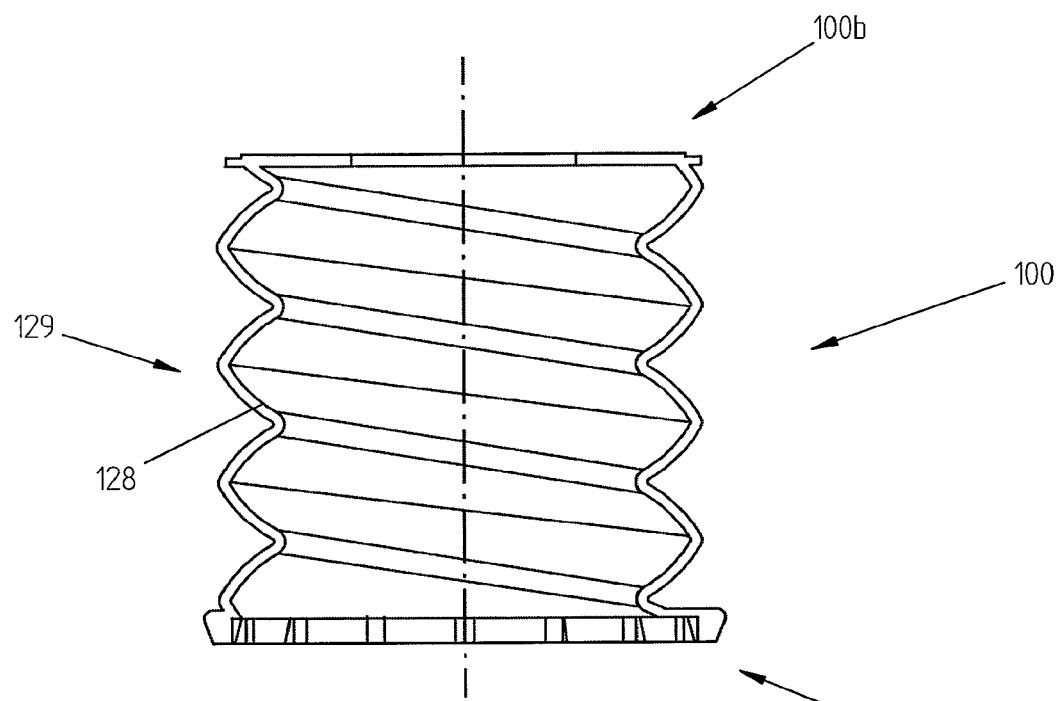
FIG. 7 shows a longitudinal sectional view of an elastic element according to a further embodiment of the present invention.

The main difference between the embodiment shown in FIG. 7 and those previously described lies in the shape of the main tubular body 129 (which always comprises a main portion developing according to a spiral-shaped pattern), which is no longer that of a truncated cone but is substantially cylindrical, the angles A and B previously described with reference to FIG. 3 being in this case substantially equal to 90°. In fact, during the development of the present invention, it emerged that the presence of the projections 151 facilitates the production process of the elastic element and thus makes it possible to choose among the widest range of plastic materials, wherein some of said materials allow elasticity characteristics that otherwise would be possible only for truncated-cone shaped elements to be ensured also for substantially cylindrical elements.

A further important embodiment of the elastic element 100 according to the present invention is provided here below with reference to FIG. 8.

Figure 8:
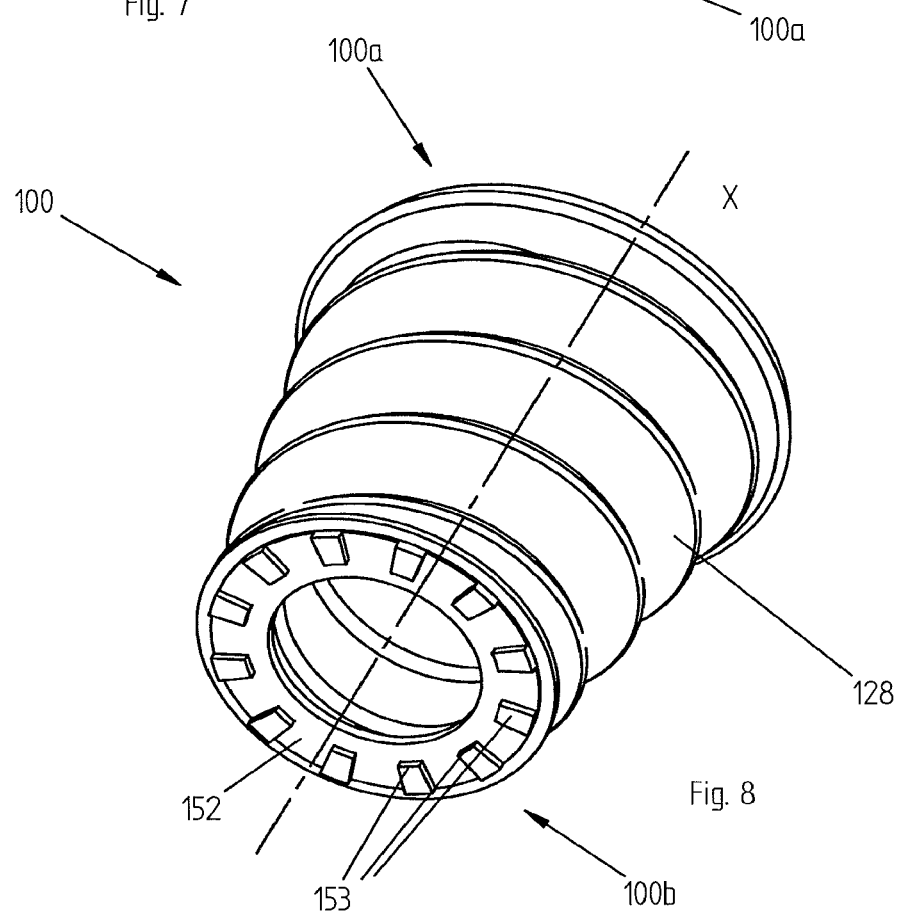
FIGS. 8 and 9 show perspective views of two embodiments of the elastic element according to the present invention.

The elastic element 100 of FIG. 8 is substantially similar to those of the embodiments already described above concerning the shape and the structure of the main tubular body 129, but however is different from them due to the fact that, in this case, it is the second end portion 100*b* (opposite the first end portion 100*a*) that comprises a plurality of projections 153 that extend along a direction substantially perpendicular to the direction of extension of the first projections 151 and therefore along a direction of extension substantially parallel to the main axis X. In particular, said second end portion 100*b* of the tubular body 128 opposite the first end portion 100*a* comprises an end wall 152 that is substantially perpendicular to said main longitudinal axis X that extends towards the outside of said main body 128. The shape of said end wall in plan view (seen from above) substantially corresponds to the shape of an annulus and the second projections 153 extend from the surface 152 towards the outside of the main tubular body 128. As the function of the second projections 153 is substantially similar to that of the first projections 151, the same function will be clarified in greater detail below. Obviously, also in this case, the extension (both along the direction parallel to the axis X and along the direction perpendicular to the axis X), the cross section, the number, the mutual distance etc. of the projections 153 may be changed and selected according to the needs and/or circumstances.

Figure 9:
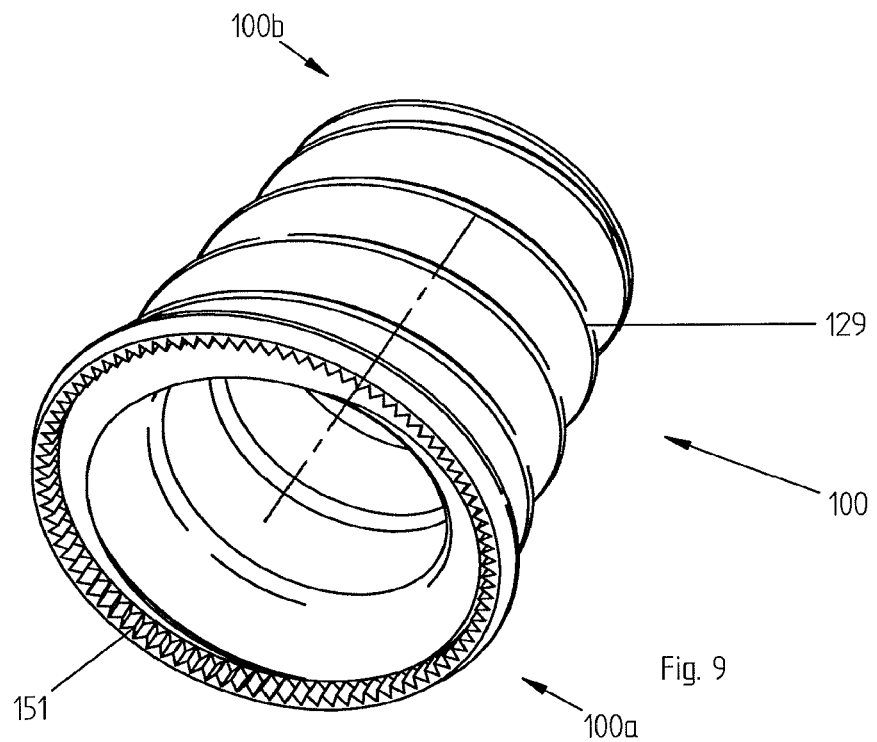

The specific feature of the further embodiment of the elastic element 100 according to the present invention represented in FIG. 9 is constituted by the shape of the first projections 151 that protrude from the internal surface 150, in this case similar to the shape of the teeth of a gear.

Figure 10:
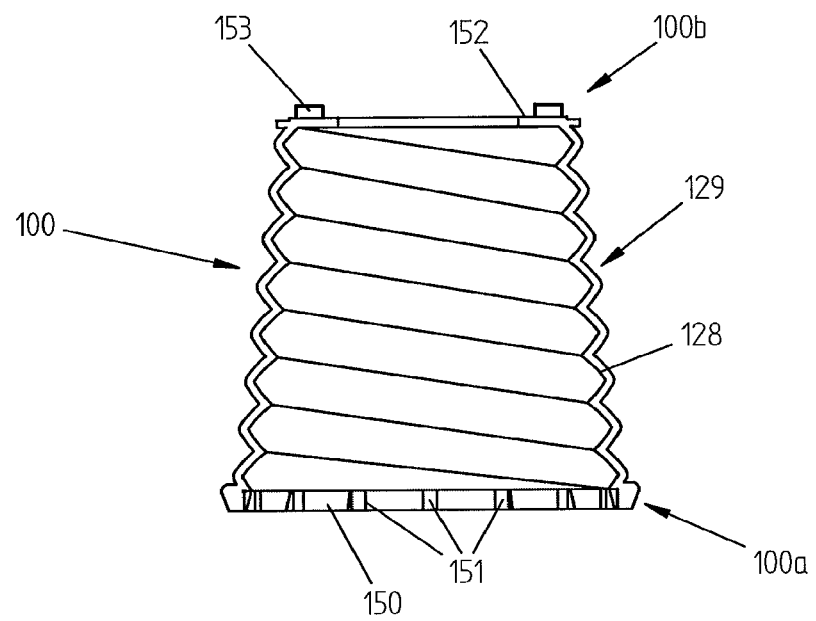
FIG. 10 shows a longitudinal sectional view of an elastic element according to a further embodiment of the present invention.

Finally, in the embodiment illustrated in FIG. 10 there are practically all of the solutions described above, meaning that the elastic element 100, in this case, comprises both the first projections 151 at the level of the first end portion 100*a* and the second projections 153 at the level of the second end portion 100*b*, protruding from the end wall 152.

A mould according to the present invention for the production of an elastic element made of a plastic material according to the present invention is described here below with reference to Figures from 11A to 11D.

Figure 11C:
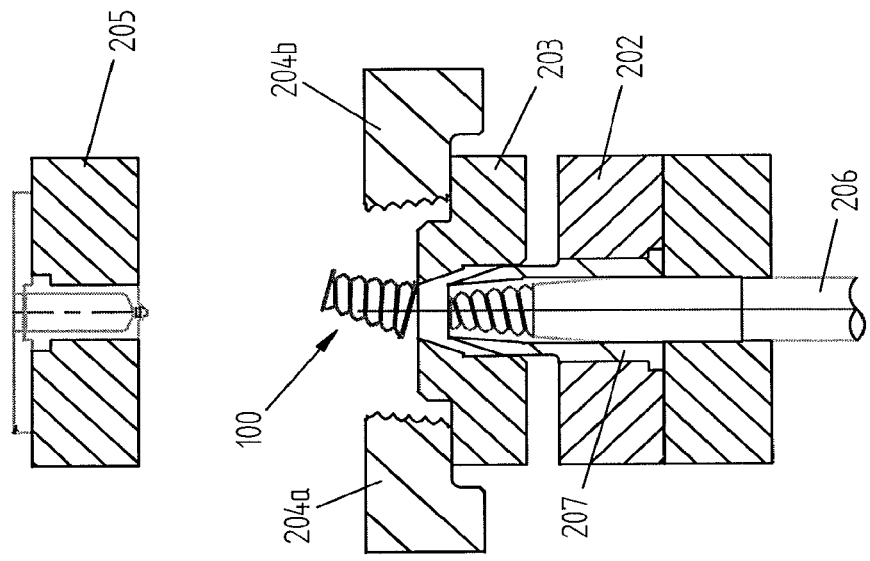
FIGS. 11A, 11B, 11C and 11D show a schematic view of a mould according to the present invention and the steps of the method according to the present invention.
Figure 11B:
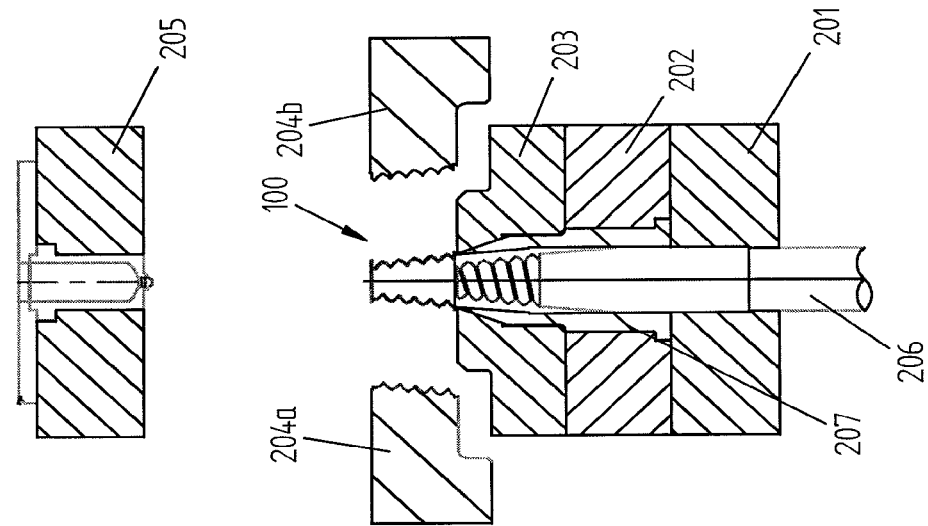
Figure 11A:
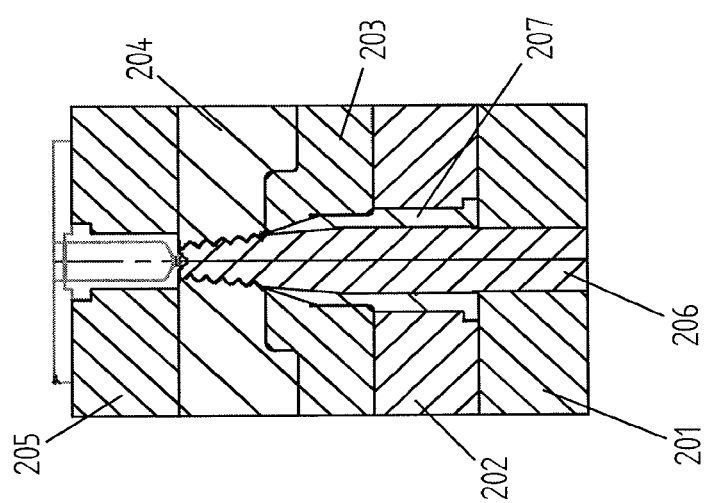
Figure 11D:
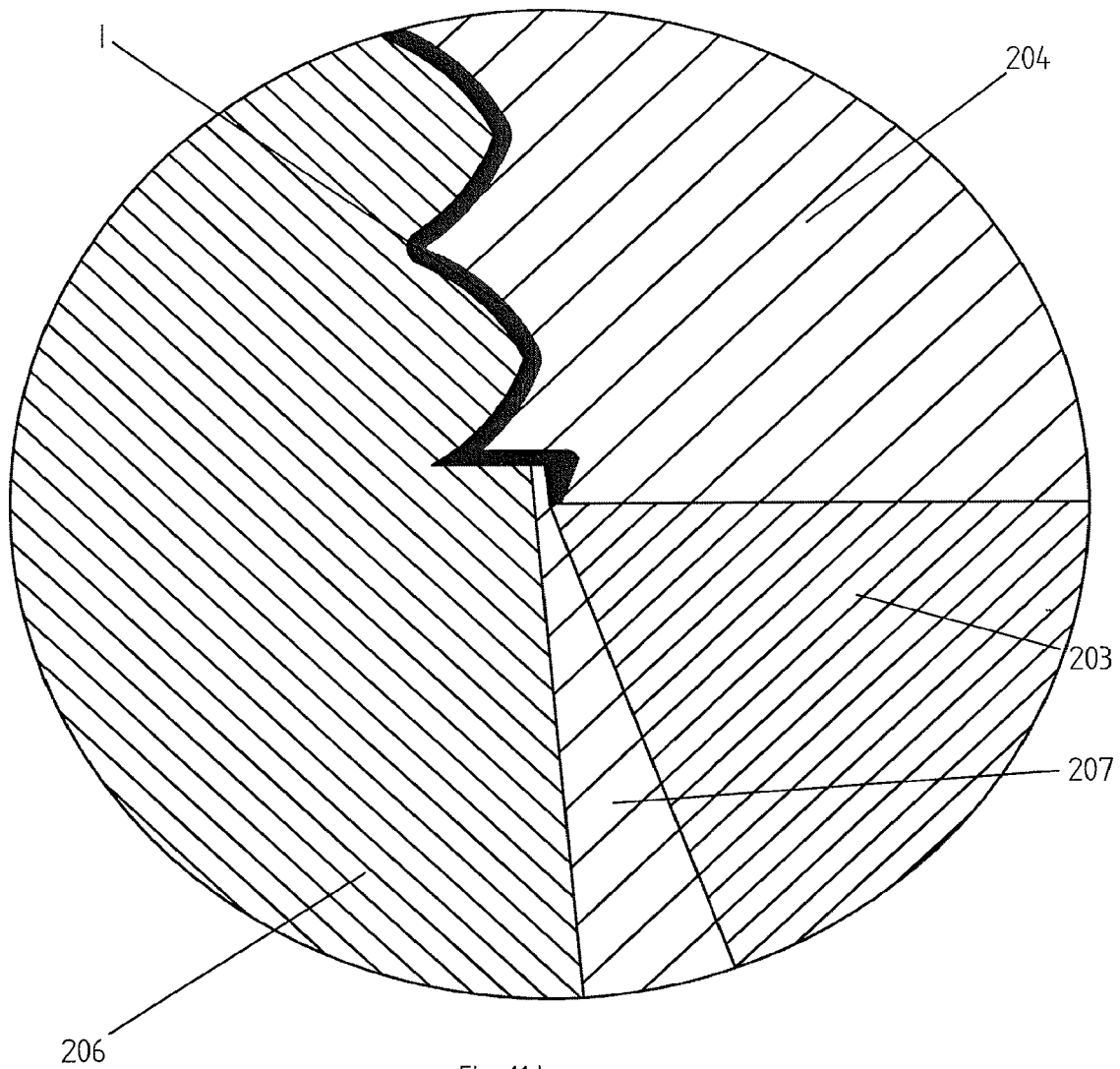

The mould 200 represented in the figures comprises at least one rotatable male punch 206 that defines a longitudinal rotation axis substantially coinciding with the axis X of the elastic element to be made, wherein the male punch 206 comprises a substantially cylindrical end portion housed in a seat having a corresponding shape and created in a fixed support 201 of the mould 200, and an intermediate portion, also substantially cylindrical (or partially slightly in the shape of a truncated cone) housed in a correspondingly shaped seat in a housing bush 207, in turn accommodated in a correspondingly shaped seat defined by a second fixed support 202 of the mould 200 superimposed to the first fixed support 201, and by a third support 203 that is movable with respect to the support 202 between the two positions respectively represented in FIGS. 11A (resting on the support 202) and 11B (detached from the support 202). In practice, the punch 206 can be rotated within the bush 207, which on the contrary is kept steady by the supports 201 and 202. The mould 200 furthermore comprises a die 204 constituted by two shells 204*a* and 204*b* suited to be positioned as shown in the figures with respect to the helical end of the punch 206, that is, in proximity to the helical end of the punch 206, in such a way as to define an interspace I in a shape corresponding to that of the elastic element 100 to be made (closed position in FIGS. 11a and 11d), wherein the two shells 204a and 204b can be moved away from the helical end of the punch 206 and placed in the open position shown in FIG. 11B.

It should furthermore be noted that the bush 207 (see FIG. 11D) comprises an end portion that extends outside of the support 203 (when this is resting on the support 202) and inside the die 204, wherein the projecting end of the bush 207 helps define the shape of the lower end of the interspace I and thus of the first lower end 100a of the elastic element 100. Said projecting end of the bush 207 comprises in particular a plurality of first cavities (defined by its external surface opposite the internal surface adjacent to the punch 206) which, while the elastic element 100 is being moulded, are filled with plastic material and thus define the first projections 151 of the elastic element described above.

In the same way, the surface of the injection unit 205 intended to come into contact with the die 204 comprises a plurality of second cavities which, while the elastic element 100 is being moulded, are filled with plastic material and thus define the second projections 153 of the elastic element 100, this further variant being thus suitable for making an elastic element 100 as shown in FIGS. 8 and/or 10.

The moulding method according to the present invention can be summed up as follows.

With the mould 200 in the configuration shown in FIG. 11A, the plastic material in the pasty state is injected in the interspace I through the injection unit 205, in a quantity sufficient to fill the interspace.

During the successive step, possibly once the plastic material has conveniently cooled down (at this point it has become the elastic element), the die 204 is opened and then the punch 206 is rotated around its longitudinal axis. At this point, due to the inevitable tendency of the plastic material to adhere to the spiral-shaped end of the male punch 206, the male punch, rotating, would tend to set rotating also the elastic element 100, with obvious and serious inconveniences. On the other hand, thanks to the presence of the first projections 151 of the elastic element that are now engaged in the corresponding first cavities of the bush 207 (fixed), the elastic element cannot be set rotating and will thus be released (if necessary by shifting the movable support 203 upwards) so that it can be removed.

Obviously, the sequence of the operations just described above can be modified according to the needs and/or circumstances, as it is possible, for example, to open the die 204 after setting the punch 206 rotating. In the same way, it will be possible to move the injection unit 205 away before or after setting the punch 206 rotating and/or opening the die 204, or even to maintain the unit 205 resting on the die 204.

The method according to the present invention is also suitable for making elastic elements according to the embodiments illustrated in FIGS. 8 and 10, in particular by proceeding as follows.

In this case, as already described above, the injection unit must comprise a plurality of second cavities which, while the elastic element 100 is being moulded, are filled with plastic material and thus define the second projections 153 of the elastic element 100.

With an injection unit of this type and with the mould 200 in the configuration shown in FIG. 11A, the plastic material in the pasty state is injected into the interspace I through the injection unit 205, in a quantity sufficient to fill the interspace.

During the successive step, possibly once the plastic material has conveniently cooled down (at this point it is the elastic element), the punch 206 is rotated around its longitudinal axis (before or after opening the die 204 but always with the injection unit 205 engaged with the elastic element 100). Also in this case, due to the inevitable tendency of the plastic material to adhere to the spiral-shaped end of the male punch 206, the male punch, rotating, would tend to set rotating also the elastic element 100, with obvious and serious inconveninces. On the other hand, thanks to the presence of the second projections 153 of the elastic element that are now engaged in the corresponding second cavities of the unit 205, the elastic element cannot be set rotating and will thus be released (if necessary by shifting the movable support 203 upwards after opening the die 204) so that it can be removed.

It has thus been shown, through the above description of the embodiments of the present invention illustrated in the drawings, that the present invention allows the set objects to be achieved. In particular, the invention makes it possible to provide an elastic element for a device for dispensing fluids that approximates as much as possible the ideal characteristics during compression and release and allows the production process of such an elastic element to be simplified.

Figure 12:
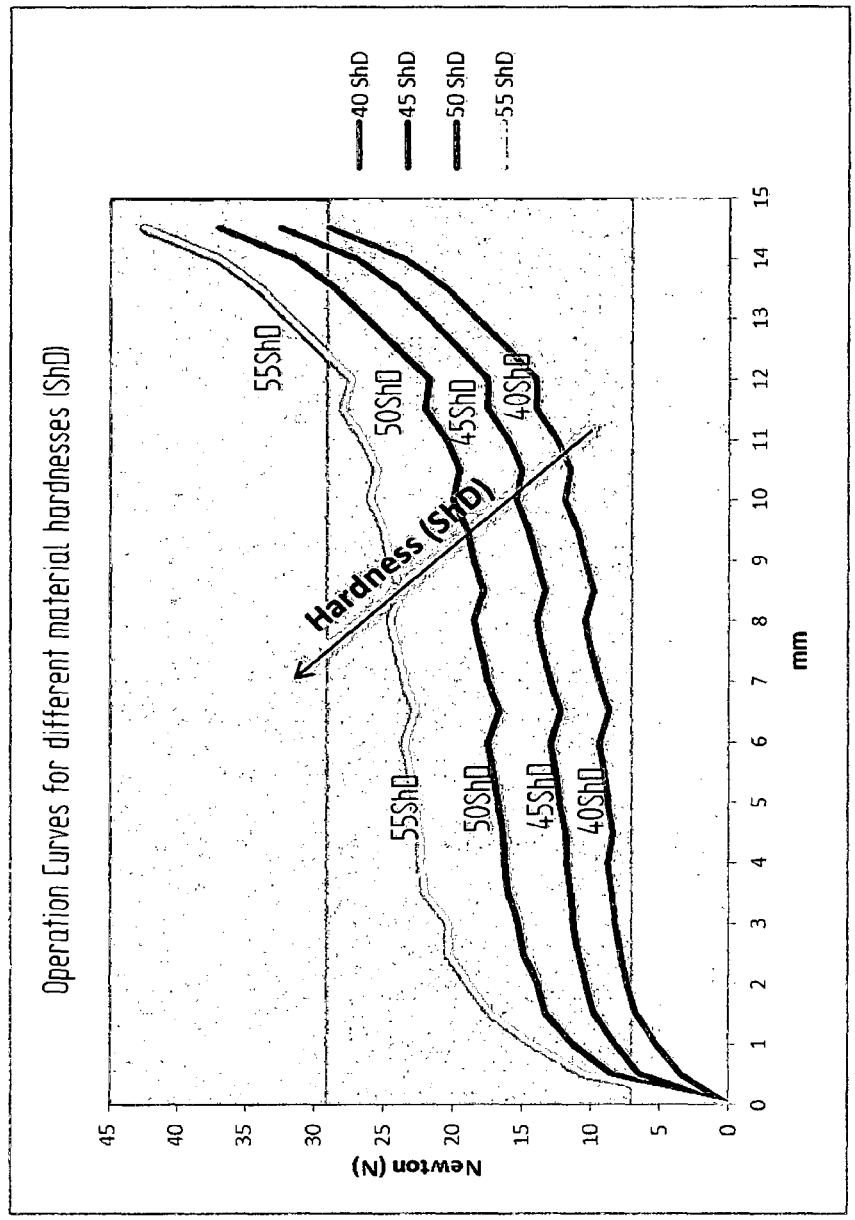
FIG. 12 sums up the elasticity characteristics of the elastic element according to the present invention.

In particular, the "elastic" characteristics of the elastic element according to the present invention are indicated in FIG. 12 and in the following table, wherein FIG. 12 and the following table show that the present invention, thanks to its shape and to the process selected for its production, makes it possible to select the material among the widest range of materials with different hardnesses, while otherwise the choice would certainly be reduced due to the limitations of the methods of the known art that have already been summed up above.

| Standard stroke considered: 12 mm Elastic response values (N) for 12 mm stroke vs hardness (ShD) | | | | |
| --- | --- | --- | --- | --- |
| Hardness | 40 ShD | 45 ShD | 50 ShD | 55 ShD |
| Δ ShD | — | 5 | 5 | 5 |
| Force (N) | 14 | 17.5 | 21.8 | 27.3 |
| Δ force (%) | 0 | 25% | 25% | 25% |

In particular, FIG. 12 and the table above show how, as the hardness of one of the possible materials selected (TPE) varies, the elastic response of the element is proportional to the variation of the hardness itself.

In particular, it can be understood that the elastic response and the hardness of the material are strictly related: for every 5-point increase (in ShD) in hardness the result is an increase of approximately 25% in elastic response.

Even though the invention has been described making reference to the attached drawings, upon implementation it may be subjected to modifications that must all be protected by the present patent, provided that they fall within the same inventive concept expressed in the following claims.

The invention claimed is:
1. A method for an injection molding an elastic element having a resilient, compressible tubular body with a spiral-shaped pattern extending in a longitudinal direction along an axis of the main tubular body, said method comprising the following steps:
   providing a mold suitable for injection molding comprising a hollow die having a fixed support and one or more movable dies and inserting a male punch along a longitudinal axis into said die in such a way as to define an interspace in a shape corresponding to that of an elastic element between said hollow die and said male punch, wherein the elastic element includes a plurality of first projections perpendicular to the longitudinal axis at one end of the elastic element and a plurality of second projections parallel to the longitudinal axis at an opposing end of the elastic element;

injecting plastic material in a pasty state into said interspace; and removing said male punch by rotating the punch about the longitudinal axis, wherein during rotation of said punch at least one of said first projections and said second projections of said elastic element becomes engaged in a corresponding seat created in the fixed support, so that said elastic element cannot be rotated by said punch.

2. The method according to claim 1, wherein said mold further comprises a housing bush for said male punch, in which said male punch is rotatably accommodated, and in that during rotation of said male punch one of said first projections or said second projections become engaged in a corresponding seat provided at an interface between said housing bush and at least one of: said fixed support, one or more of said dies, and said male punch.

3. The method according to claim 2, wherein the injecting step includes an injection unit suited to be positioned proximal to said interspace so as to allow a plastic material in the pasty state to be injected into said interspace, and during rotation of said punch one of said first projections or second projections become engaged in a corresponding seat provided in said injection unit.

* * * * *